Patented Sept. 23, 1930

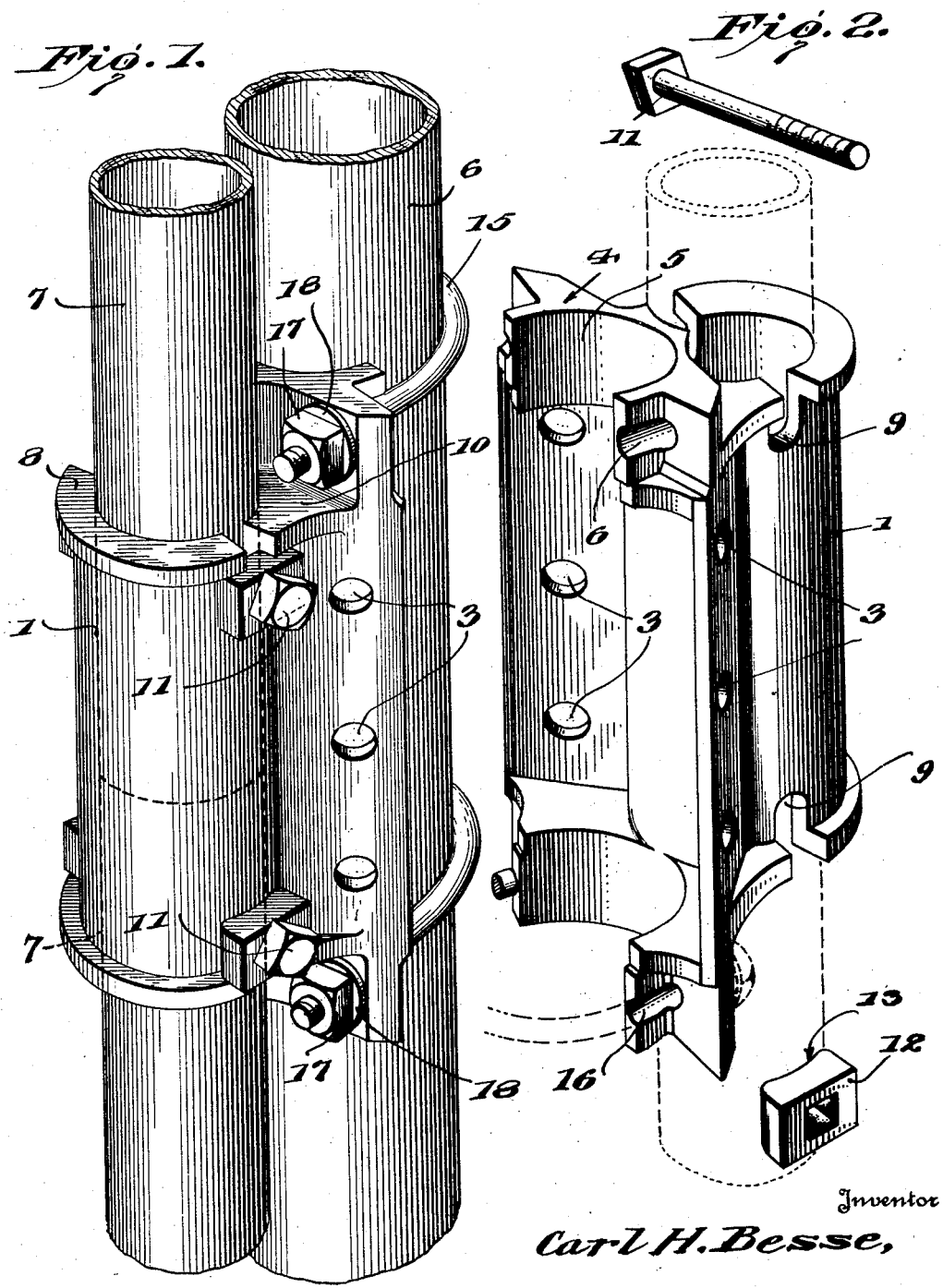

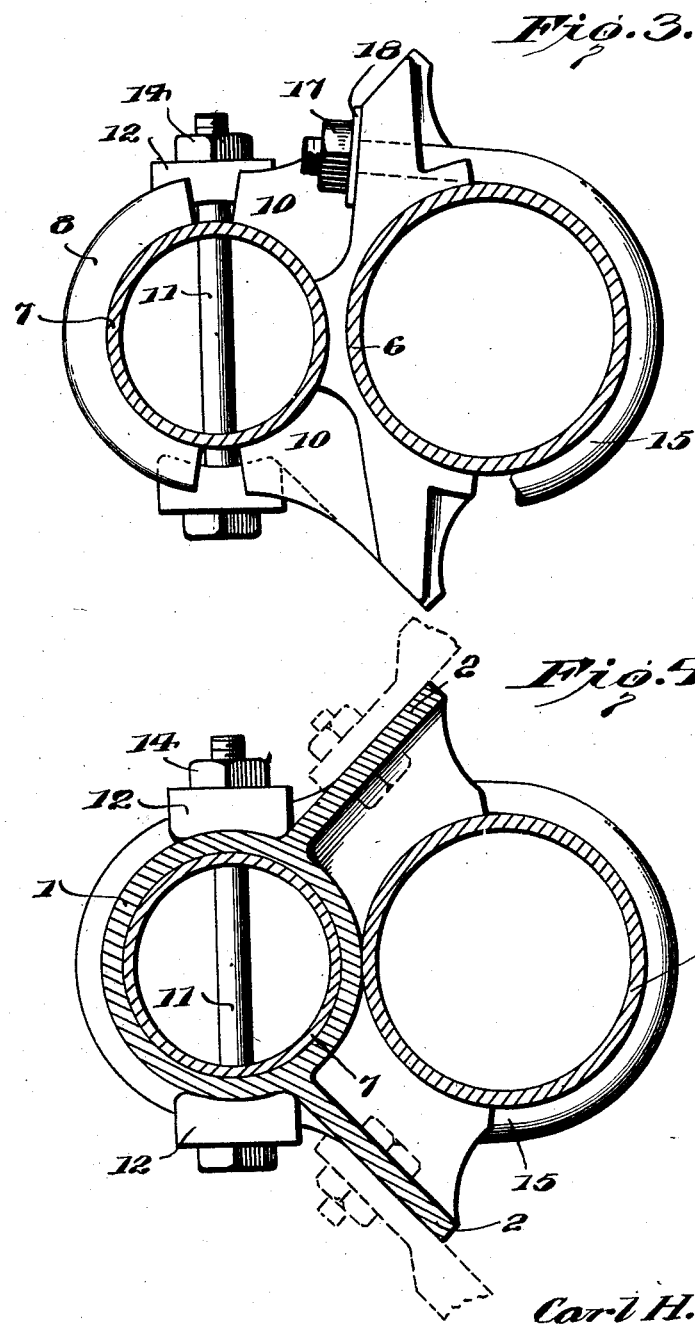

1,776,345

UNITED STATES PATENT OFFICE

CARL H. BESSE, OF TULSA, OKLAHOMA, ASSIGNOR TO THE NATIONAL TURNBUCKLE DERRICK COMPANY, OF TULSA, OKLAHOMA, A CORPORATION OF OKLAHOMA

DERRICK OR TOWER CONSTRUCTION

Application filed May 11, 1927. Serial No. 190,601.

This invention relates to improvements in derrick or tower construction, having for an object to provide a leg coupling bracket or iron of that general type exemplified in my copending United States application for patent, Serial Number 173,685, of which the present invention is an improvement whereby a metal or so-called steel derrick may be re-legged that the same can be practicably employed for drilling, spudding or in like heavy duty operations, subsequently to which the relegs may be conveniently and quickly removed, thus leaving standing a light steel derrick suitable for pumping purposes; the salvaged relegs being capable of usage in connection with other construction work.

The invention may be also stated to comprehend a bracket or "iron" of the character mentioned formed in a single piece and adapted to have the adjacent portions of the legs of a derrick longitudinally introduced thereinto, whereupon the legs and the bracket are positively and fixedly interconnected through the medium of connecting bolts engaging through portions of said legs and brackets in a manner to absolutely prevent any attempts at longitudinal shifting or creeping therebetween and also, to prevent any and all possibility of longitudinal shifting or disengagement of said bolts from the bracket, hence, insuring a permanent and efficient coupling between the derrick leg sections and thereby, lending to the stability of the derrick construction.

Amongst other desiderata of the invention there may be mentioned the provision of a derrick or tower leg coupling bracket combining in a single and integral construction, means for positively and rigidly interconnecting the leg sections and means for receiving and facilitating the rigid securing or clamping of relegs to the derrick legs, together with still other means permitting of the connection of the usual trussing or tensioning devices thereto, whereby all of the derrick legs are inter-braced with respect to each other. It is also an object of the invention to provide a coupling bracket having web-like tension device engaging plates integral with the bracket proper and integral cradle-like extensions or arms adjacent portions of the plates and brackets whereby to receive portions of relegs therein, said relegs, because of the disposition of the cradle like extensions, being arranged longitudinally of and between the extension plates and in substantially parallelism to the derrick legs so that with secure clamping of the relegs to the cradle like extensions, a positive and rigid connection will be effected between the legs and relegs.

Other objects of the invention will be in part obvious and in part pointed out hereinafter.

In order that the invention and its mode of operation may be readily understood by those skilled in the art, I have in the accompanying illustrative drawing and in the detailed following description based thereupon, set out one possible embodiment of the invention.

In these drawings:

Figure 1 is a perspective view of the improved coupling bracket showing the same in operative form with respect to the legs and relegs of the derrick construction, Figure 2 is a similar view showing the legs and relegs removed and the connecting bolts in removed position, Figure 3 is an end elevation of the improved coupling bracket, the legs and relegs being shown in section and a portion of one of the U-shaped clamping bolts being broken away and Figure 4 is a transverse section through the same.

Having more particular reference to the drawings in connection with which like numerals of reference will designate corresponding parts throughout, the improved bracket may be stated to comprise a tubular leg receiving body portion designated by the numeral 1 having relatively right angularly arranged tension device or truss engaging plates 2 cast integral with portions of the same and disposed longitudinally thereof, said plates having a plurality of tension or truss device engaging openings 3 formed therein.

Integrally cast or otherwise formed with the body portion 1 and the right angularly arranged plates 2 is a pair of cradle-like extensions or arms 4, these arms as will be noted, being positioned adjacent the opposite extremities of the body portion 1 and the said plates 2, portions of the arms constituting longitudinal extensions of the right angularly opposed plates 2 as is shown in the Figures 1 and 2. These arms 4 are provided upon their inner sides with cradle like embracing portions 5 disposed transversely of the body 1 and the plates 2, hence, form means for receiving a portion of a releg 6 snugly therein; said releg because of the disposition of the arms 4 with their cradle like embracing portions 5 being arranged between and extended longitudinally of the body 1 and the plates 2 in proximity and substantially parallelism to said body 1.

That the derrick leg sections 7 equipped with the improved coupling bracket may be positively secured against longitudinal shifting or creeping in the body 1 subsequently to their longitudinal introduction thereinto, the opposite ends of the said body are flanged as indicated by the numeral 8 while diametrically opposed longitudinally extending pockets or recesses 9 are formed in the opposite ends of the body 1 and the adjacent portions of the respective flanges 8 thereon: these flanges 8 being formed with integral web-like extensions 10 which are integral with portions of the outer sides of the arms 4 adjacent their points of jointure with the opposite ends of the right angularly opposed plates 2, hence, effecting an integral bracing means as between the body portion and the plates 2 and the arms 4.

Connecting bolts 11 are adapted to be passsed through diametrically arranged openings in the adjacent or abutting ends of the leg sections 7 and receive upon the opposite extremities thereof beyond the adjacent portions of the outer peripheral surfaces of said legs 7, washers or similar bearing devices 12, the inner sides of which are concaved or are curved as indicated by the numeral 13, this concavity or curving corresponding to the curvature of the outer peripheral surface of the body 1 adapted to receive the leg sections 7 therein. Locking nuts 14 are adapted to be engaged with the screw threaded extremities of the several connecting bolts 14 and thereby, with turning and tightening of said nuts upon their respective bolts, a binding and clamping connection will be established between the washers 13 and the engaged portions of the body 1.

Also, it is to be noted that because of the depth of the inwardly disposed pockets 9, the connecting bolts 11 will be so arranged as to permit of the abutting engagement of the bolt carried washers 13 with the inner sides of the longitudinally opposed flanges 8, hence, preventing any possibility of longitudinal disengagement of the bolts 11 from the pockets 9 of the body portion 1 and consequently, positively anchoring or connecting the abutting or meeting ends of the derrick leg sections 7 in said body portion 1.

With a view toward providing the coupling bracket with means for securing the relegs 6 thereto, i. e., to the integral arms 4 and between the right angularly opposed plates 2, substantially U-shaped clamping bolts designated by the numeral 15 are provided, the curvature of these bolts corresponding to the peripheral surface of said relegs 6 so that a snug engagement between the same will be insured; the extremities of the U-shaped bolts being adapted to be received through openings formed in the opposite extremities of the arms 4 aligning with grooves 16 disposed longitudinally of the extremities of the cradle like portions 5 of said arms as is shown in the Figure 2. Following this engagement, locking nuts 17 are turned into engagement with the screw threaded extremities of the U-shaped bolts 15 and preferably, have bearing upon washers or similar devices 18 interposed between the same and the adjacent faces of the opposite ends of the arms 4. By turning these locking nuts 17 to the desired degree upon the screw threaded extremities of the U-shaped bolts 15, it will be understood that the adjacent portions of the releg 6 will be clampingly secured in the cradle like portions 5 of the arms 4 and that inasmuch as the releg is disposed between and longitudinally of the plates 2 and in parallelism to the body portion 1, a positive and rigid interconnection will be effected between the releg 6 and the legs 7, hence, permitting the latter to be effectually braced and strengthened by the former.

In using my improved coupling bracket, the body portion 1 is arranged in a position to be first longitudinally engaged over the upper end of the lower leg section 7 preparatory to which a connecting bolt 11 together with the washers 12 and a locking nut 14 have been properly engaged and assembled. At this time, the bracket is dropped so that the open lower end of body thereof will engage over the upper end of said lower leg section 7 whereupon the diametrically arranged connecting bolt 11 will enter the correspondingly arranged pockets 9 formed upon the lower end of said body portion 1 stopping only when said bolt engaged with the inner ends of the pockets 9. At this time, the locking nut 14 of the connecting bolt 11 is tightened so as to effect a clamping of the relatively spaced washers 12 upon adjacent portions of the peripheral surface of the body 1; it being noted that incidental to such tightening of the locking nut 14, the lower marginal portion of each of the washers 12 will be brought into abutting engagement with the adjacent side of the lowermost flange 8, thereby permitting said washers 12 to span the openings in the flange 8 and thereby to positively interlock the body portion 1 and the lower leg section 7. The lower end of the upper leg section 7 is now equipped with a connecting bolt 11, washers 12 and a locking nut 14, whereupon said section is dropped so that its bolt equipped lower end will engage in the diametrically opposed pockets 9 formed in the upper end of the body portion 1, the extent of this engagement being limited by the abutting of adjacent portions of said bolt 11 upon the inner ends of the pockets 9. At this time, the lower end of the upper derrick leg section 7 will have been longitudinally introduced into the body portion 1 and to secure the same against displacement, the locking nut 14 is turned in a direction to tighten the same, thereby moving the washers 12 inwardly with respect to said body portion 1 and finally, clampingly engaging said washers 12 with the adjacent portions of the peripheral surface of the body 1 as well as effecting an abutting engagement of the upper marginal portions of each of said washers with the adjacent inner sides of the uppermost flange 8, thereby closing the outer ends of the pockets 9 and consequently thereupon, effecting a positive interlock between the lower end of the upper leg section 7 and the upper end of the body portion 1. This motive operandi is completed until the desired number of bracket insulations have been made. To effect relegging of the derrick legs 7, a releg such as indicated by the numeral 6 is snugly received in the cradle like portions 5 of the arms 4, said releg extending between and longitudinally of the plates 2 and in parallelism to the body portion 1. U-shaped clamping bolts 15 are now transversely engaged over the releg 6, the extremities thereof passing through the openings formed in the extremities of the longitudinally opposed arms 4, whereupon locking nuts 17 are turned into engagement therewith to effect a clamping connection between said arms 4 and the releg 6. Trusses or other tensioning devices may be now engaged with the right angularly opposed plates 2 through the openings 3 formed therein, although it will of course be understood that the trusses may be engaged with the plates 2 either before or after the clamping arrangement of the releg 6 through the medium of the arms 4 and bolts 15 to the body portion 1.

Subsequently to a drilling or similar heavy duty operation of the relegged derrick equipped with the improved coupling bracket, it of course will be understood that the relegs 6 adjacent the various derrick leg sections 7 may be and are adapted to be removed by disengagement of the clamping bolts 15 from the apertured extremities of the arms 4 following which said relegs may be readily disengaged from the coupling bracket, thus leaving the lighter derrick stamping and available for pumping purposes; the removed equipment being completely salvaged for a further relegging operation.

Manifestly, the construction shown is capable of considerable modification and such modification as is within the spirit of my claims, I consider within the scope of my invention.

I claim:

1. A derrick leg bracket comprising a leg receiving body portion, having inwardly disposed longitudinally extending pockets formed in the opposite ends thereof, means carried on the adjacent ends of the leg sections adapted to have vertical interlocking engagement in said pockets, relatively angularly arranged plates integral with and disposed longitudinally of the body portion, and releg receiving arms arranged transversely of the body portion and integral therewith and with the opposite ends of said plates, said releg receiving arms being arranged in longitudinally opposed relation between said plates.

2. A derrick leg bracket comprising in combination with sectional derrick legs, a tubular body portion, connecting means engaged with the adjacent ends of said derrick leg sections, adapted to have vertical slidable interlocking engagement with the opposite ends of said body portion and portions of said legs being introduced longitudinally of said body portion, relatively right angularly arranged plates integral with and disposed longitudinally of the body portion, transversely disposed releg receiving arms integral with the body portion and with the opposite ends of said plates, said arms having certain of their sides formed with cradle like receiving portions disposed in longitudinally opposed relation between said plates, and releg clamping means detachably engageable with portions of said arms.

3. A derrick leg bracket comprising in combination with sectional derrick legs, a leg receiving body portion, connecting means on the adjacent ends of the derrick leg sections adapted, with longitudinal introduction of said ends into the body portion to effect an interlocking connection between said legs and said body portion, means on the body portion adapted for connection with tensioning devices, and releg receiving means on the body portion in longitudinally opposed relation.

4. A derrick leg bracket comprising a tubular leg receiving body portion having relatively opposed longitudinally extending pockets formed in the opposite ends thereof, connecting means on the adjacent ends of the derrick leg sections adapted to have slidable engagement with said pockets upon longitudinal introduction of the derrick leg section into the body portion, means on the body portion engageable with said connecting means for locking the same against movement longitudinally of the body portion, at times, means on the body portion adapted for connection with tensioning devices, and releg receiving means on said body portion.

5. A derrick leg bracket comprising in combination with longitudinally aligned derrick leg sections, a tubular body portion having longitudinally disposed and marginally opening pockets formed in the opposite extremities thereof, the opposite ends of said body portion being flanged, connecting means on the adjacent end of the derrick leg sections receivable in said pockets, portions of said connecting means adapted to have abutting engagement with said flanges whereby to prevent longitudinal movement of said connecting means and the derrick leg sections at times, means on the body portion adapted for connection with tensioning devices, and releg receiving means on said body portion.

6. A derrick leg bracket comprising in combination with longitudinally opposed derrick leg sections, a tubular leg receiving body portion having pairs of longitudinally disposed and marginally opening pockets formed in the opposite extremities of the same, the opposite longitudinal ends of said body portion being flanged, connecting means engaged through the adjacent ends of said derrick leg sections adapted to be slidably engaged in said pockets with longitudinal introduction of the adjacent ends of said derrick leg sections into the tubular body, portions of said connecting means having abutting engagement with portions of said flanged ends of the tubular body, at times, relatively angularly arranged plates integral with and disposed longitudinally of the body portion, releg receiving means integral with the body portion and with the opposite ends of said plates and arranged in longitudinally opposed relation between said plates, and releg engaging and clamping means detachably engaged with portions of said arms.

7. A derrick leg bracket comprising in combination with longitudinally opposed derrick leg sections, a tubular body portion having pairs of longitudinally disposed marginally opening pockets formed therein, the opposite ends of said body portion being flanged, connecting means engaged through the adjacent ends of said derrick leg section adapted to be slidably received in said pockets with longitudinal introduction of said sections into the tubular body portion, portions of said connecting means having abutting engagement with the flanged opposite ends of the body portion, at times, relatively right angularly arranged plates integral with and disposed longitudinally of the body portion, transversely arranged releg receiving means integral with the body portion and the opposite ends of said plates, certain of the sides of said arms having cradle like releg receiving portions therein, and releg engaging and clamping means detachably engaged with said arms.

In witness whereof I have hereunto set my hand.

CARL H. BESSE.